United States Patent
Brownlie

[11] 3,822,898
[45] July 9, 1974

[54] TOWING APPARATUS FOR A CYCLE AND THE LIKE

[76] Inventor: William M. Brownlie, 1201 Falcon, Dearborn, Mich. 48128

[22] Filed: July 18, 1973

[21] Appl. No.: 380,132

[52] U.S. Cl. ............................ 280/402, 224/42.08
[51] Int. Cl. ............................................ B60p 3/06
[58] Field of Search ......... 280/402, 292; 248/226 B, 248/228; 224/42.03 B; 214/450

[56] References Cited
UNITED STATES PATENTS
2,789,832  4/1957  Zumwalt ...................... 280/402 X
3,428,332  2/1969  McCance ...................... 280/402 X
3,458,073  7/1969  Dawson ...................... 224/42.08 X Primary Examiner—Stanley H. Tollberg
Assistant Examiner—Norman L. Stack, Jr.
Attorney, Agent, or Firm—Lon H. Romanski

[57] ABSTRACT

A towing appparatus for towing a vehicle such as a motorcycle behind another vehicle such as an automobile has a pair of channel-like members, adapted for the reception therein of a wheel of the towed vehicle, pivotally connected to each other so as to be swingable toward each other to a closed position when not towing a vehicle, and swingable away from each other to a position for the reception therebetween of a wheel of a vehicle being towed.

10 Claims, 12 Drawing Figures

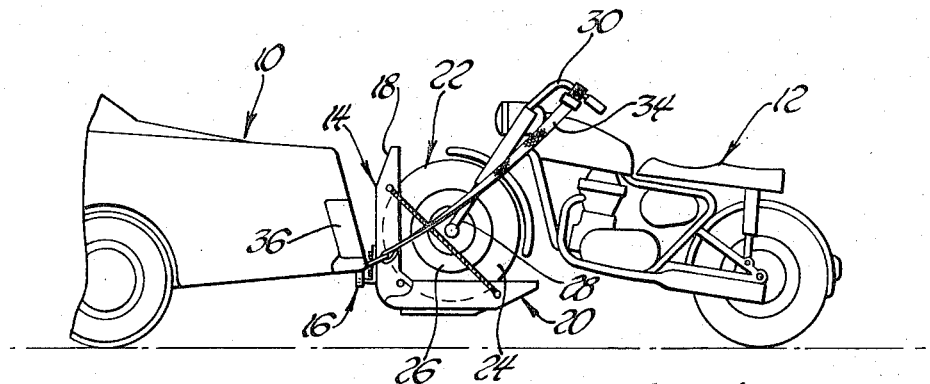
Fig. 1
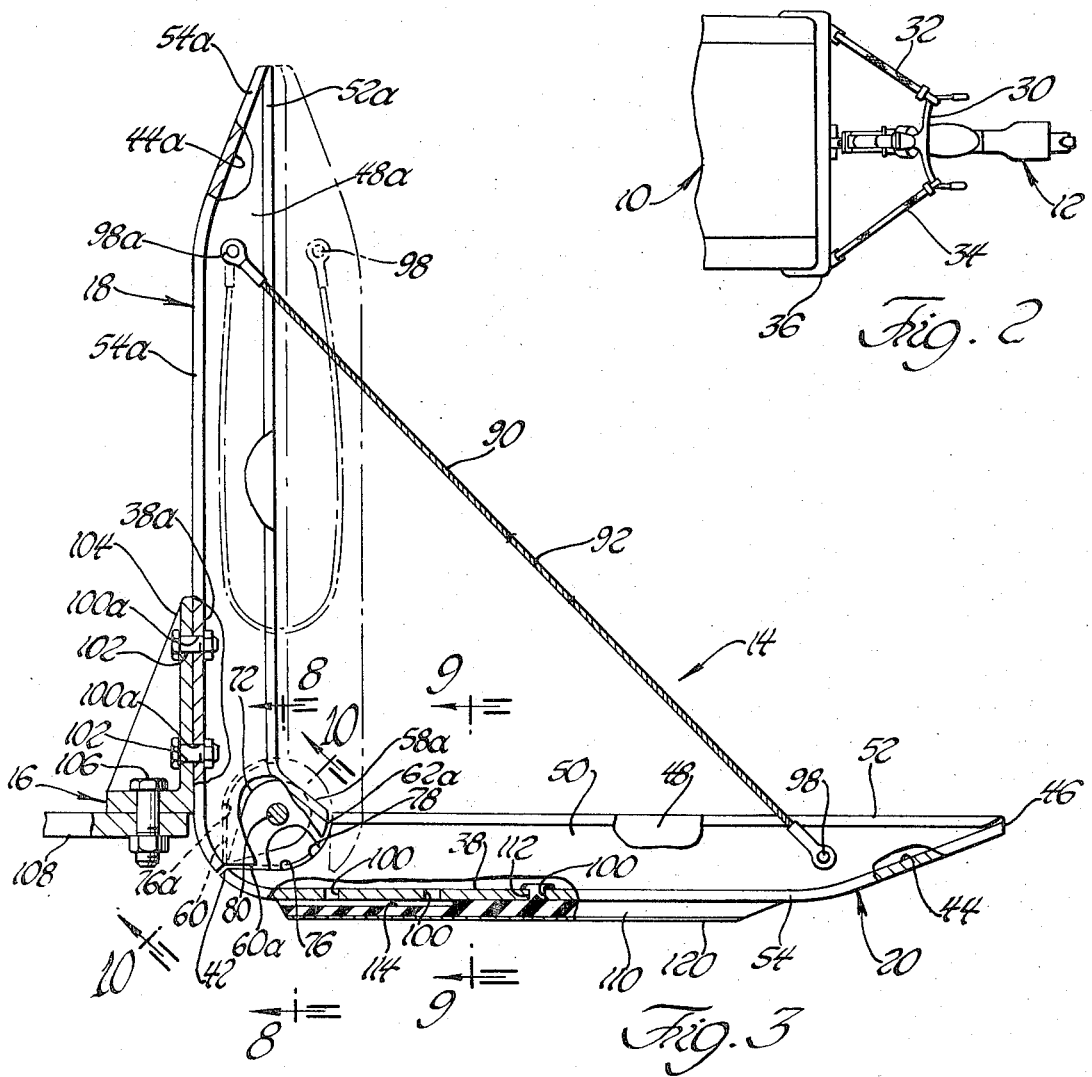
Fig. 2
Fig. 3

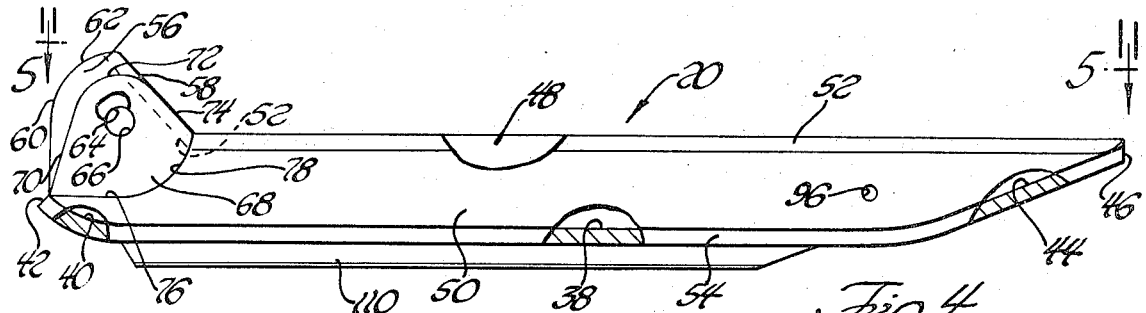
Fig. 4
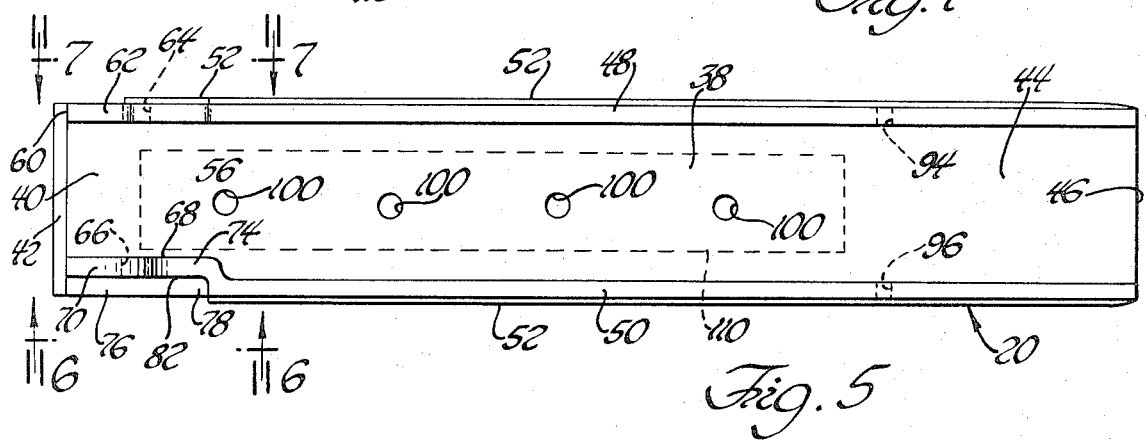
Fig. 5
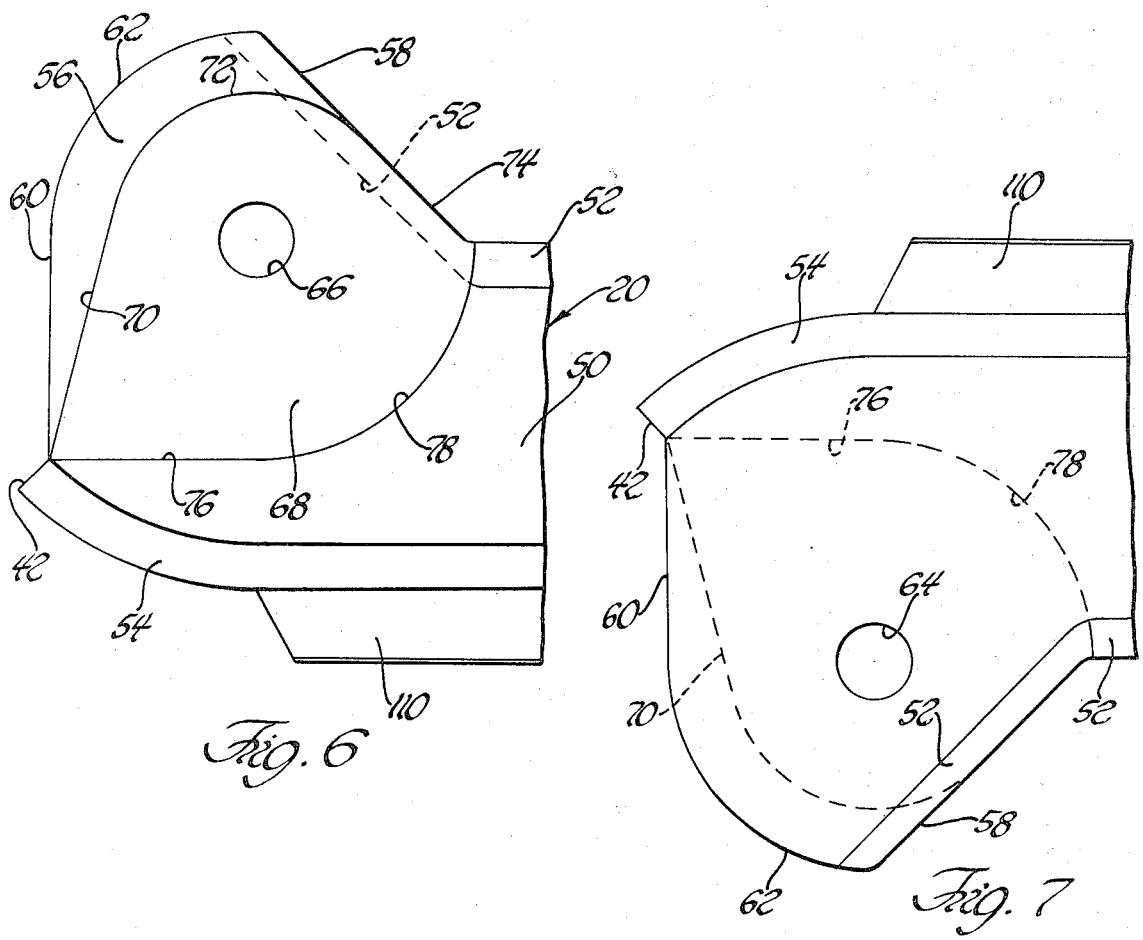
Fig. 6
Fig. 7

TOWING APPARATUS FOR A CYCLE AND THE LIKE

BACKGROUND OF THE INVENTION

Heretofore, various forms of towing apparatus have been suggested by the prior art. Generally such prior art devices fall into one of three categories the first of which is comprised of such tow bar or draw bar arrangements wherein towed vehicles such as cycles maintain their front and rear wheels in rolling engagement with the road surface and the cycle is connected to the towing vehicle by draw bar means which is commonly of considerable length and requires a considerable degree of ability and dexterity for its successful use.

The second category comprises such towing devices which, with respect to vehicles such as motorcycles, maintain both the front and rear wheels off of and above the roadway as by suitable racks or carriers affixed to the towing vehicle. In this sense such arrangements are not truly towing because of the fact that the full weight of the cycle, for example, is carried by and through the vehicle carrying the cycle. Such prior art arrangements have not been totally acceptable in that they require the manual lifting of the entire carried vehicle and the placement thereof within the rack or carrier means provided on the carrying vehicle. Further, the fact that the full weight of such carried vehicle must be supported by the carrying vehicle places substantial and often excessive loads on the suspension system of such carrying vehicle.

The third category comprises such towing devices which, with respect to vehicles such as motorcycles, maintain the front wheel of the towed vehicle off the roadway while permitting the rear wheel to be in rolling and tracking engagement with the roadway. Such prior art devices, as typically illustrated for example by U.S. Pat. No. 3,428,332 granted to F. N. McCance, employ cradle-like structure, which fixedly protrudes a substantial distance rearwardly of the towing vehicle, as to therein receive such front wheel. Once the towed vehicle is removed from the cradle, the cradle assembly has to be removed from the towing vehicle in order to prevent the possibility of damage occurring, from such protruding cradle, to other vehicles. Various attempts have been made in the past to obviate the necessity of such removal of the cradle assembly; however, such have not been found acceptable.

Accordingly, the invention as herein disclosed and claimed is primarily directed to the solution of the above as well as other related problems.

SUMMARY OF THE INVENTION

According to the invention, a towing apparatus for a cycle or the like comprises first and second wheel engaging and containing members hingedly secured to each other, one of said members being adapted to be detachably secured to an associated towing vehicle, and the other of said members being adapted to have two effective positions the first of which is in a generally horizontally disposed condition whereby reception of said wheel is made possible and the second of which is in a generally vertically disposed condition closed against said one of said members to thereby define an additional safety type guard at the rear of the towing vehicle when said towing vehicle is not towing a cycle or the like.

Various general and specific objects and advantages of the invention will become apparent when reference is made to the following detailed description of the invention considered in conjunction with the accompanying drawings.

BRIEF DESCRIPTION OF THE DRAWINGS

In the drawings, wherein for purposes of clarity certain details and elements may be omitted from one or more views:

FIG. 1 is a side elevational view of a partially illustrated towing vehicle equipped with towing apparatus according to the invention with a motorcycle being towed thereby;

FIG. 2 is a view of reduced scale taken generally on the plane of line 2—2 of FIG. 1 and looking in the direction of the arrows;

FIG. 3 is an enlarged view of the towing apparatus shown in FIG. 1;

FIG. 4 is an enlarged side elevational view of one of the elements shown in FIG. 3;

FIG. 5 is a view taken generally on the plane of line 5—5 of FIG. 4 and looking in the direction of the arrows;

FIG. 6 is an enlarged fragmentary side elevational view taken generally on the plane of line 6—6 of FIG. 5 and looking in the direction of the arrows;

FIG. 7 is an enlarged fragmentary side elevational view taken generally on the plane of line 7—7 of FIG. 5 and looking in the direction of the arrows;

DETAILED DESCRIPTION OF THE PREFERRED EMBODIMENT

Figure 8:
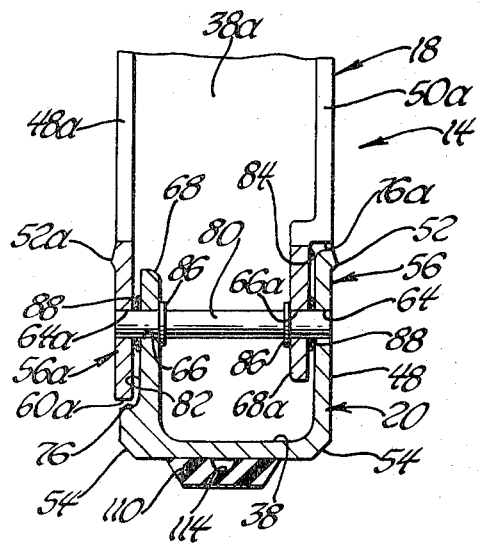
FIG. 8 is an enlarged cross-sectional view taken generally on the plane of line 8—8 of FIG. 3 and looking in the direction of the arrows.

Referring now in greater detail to the drawings, FIG. 1 illustrates a vehicle, such as an automobile 10, towing a motorcycle 12 as by means of a towing apparatus 14 operatively secured to the vehicle 10 as by means 16. The towing apparatus 14 is generally comprised of vertical and horizontal channel-like members 18 and 20 which cooperate to receive generally therebetween the front wheel assembly 22 of the cycle 12.

Generally, as illustrated, the cycle front wheel assembly 22 may be comprised of a tire 24 situated about a wheel 26 which is journalled to a fork 28 of the cycle steering gear assembly including steering handlebar 30. When the cycle has its front wheel 22 situated within the apparatus 14, suitable means such as, for example, adjustable straps 32 and 34 are respectively attached to opposite ends of the handlebar 30 and to the towing vehicle as, for example, by detachable attachment to the vehicle bumper 36.

As will become apparent, in the preferred embodiment, members 18 and 20 are identical to each other.

As typically illustrated in FIGS. 4 and 5, member 20 is comprised of a lower generally horizontally disposed wall or track 38 which, at one end, curves generally upwardly in an arc as at 40 to terminate at 42 and which, at an other end, has a portion 44 inclining upwardly and terminating at 46.

Integrally formed with track 38 are oppositely disposed parallel side walls 48 and 50 which may have upper and lowered generally chamfered or inclined portions 52 and 54 extending generally along the edges thereof.

As seen generally at the left end of FIGS. 4 and 5, wall 48 has an integrally formed ear or tab-like extension 56 which may include an edge 58 disposed at generally 45° with respect to the top edge of wall 48. The hidden-line portion on ear 56 indicates the continuation of portion 52. A generally vertically extending edge surface 60 blends tangentially with an arcuate edge surface 62 which has a radius of curvature struck from the centerline of aligned journal-type apertures 64 and 66. As can best be seen in FIG. 5, ear 56 is in alignment with wall portion 48.

Somewhat similarly, wall 50 has an integrally formed ear-like extension 68 which (unlike ear 56 and as best seen in FIG. 5) is offset from and generally inwardly of wall 50. An edge surface 70, somewhat inclined from the vertical, tangentially blends with an arcuate edge surface 72 which has a radius of curvature struck from the centerline of aperture 66 and which also terminates in an inclined edge 74 which may also be at generally 45° with respect to the top edge of walls 50 and 48.

Because of the general offset of wall 68, a generally transversely extending surface is provided as to define, what might be considered, an apparent terminal surface of wall 50. More specifically, such surface is comprised of a first horizontally extending surface portion 76 which tangentially blends with an arcuate surface portion 78 with such arcuate surface portion have a radius from the centerline of aperture 66 but of a magnitude somewhat greater than the magnitude of the radius of arcuate portion 62 of ear or projection 56.

As was previously indicated, in the preferred embodiment of the invention members 18 and 20 are made as to be substantially identical to each other. Therefore, those portions of member 18 corresponding to portions of member 20 are identified with like reference numbers provided with a suffix "a."

As generally depicted in FIG. 3, members 18 and 20 are pivotally connected to each other as by a pivot or journal pin 80 received by apertures 64, 66, 64a and 66a. As shown in FIG. 8, it can be seen that when such identical members 18 and 20 are pivotally assembled to each other the space generally outwardly of the outer side surface 82 of ear 68 (and peripherally defined generally by transverse surfaces 76 and 78) is occupied by the ear or extension 56a of member 18 so as to thereby form a generally continuous appearing outer wall surface as between walls 48a and 50 of members 18 and 20 respectively. Similarly the space generally outwardly of the outer side surface 84 of ear or extension 68a (and peripherally defined generally by transverse surfaces 76a and 78a) is occupied by the ear or extension 56 of member 20 so as to thereby form a generally continuous appearing outer wall surface as between walls 48 and 50a of members 20 and 18, respectively.

Further, in the preferred embodiment, suitable retaining means such as, for example, snap rings or the like 86 are provided to prevent the unintentional axial removal of pin 80 while suitable restraining means such as spring-like members 88 are provided in order to assure the existence of a predetermined degree of resistance to relative pivotal motion of members 18 and 20 so as to thereby maintain the apparatus 14 in a closed position as when the member 20 is moved upwardly to the position depicted in phantom lines in FIG. 3.

Figure 9:
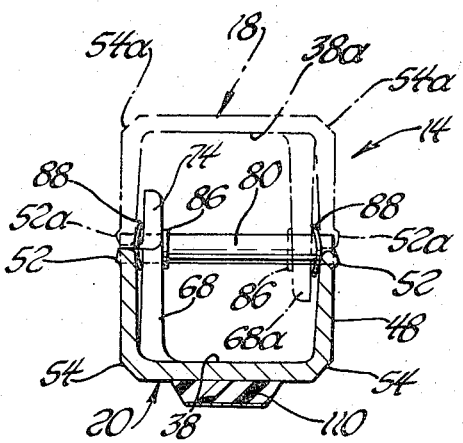
FIG. 9 is an enlarged cross-sectional view taken generally on the plane of line 9—9 of FIG. 3 and looking in the direction of the arrows.
Figure 10:
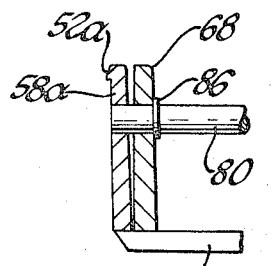
FIG. 10 is an enlarged fragmentary cross-sectional view taken generally on the plane of line 10—10 of FIG. 3 and looking in the direction of the arrows.

FIG. 9, a cross-sectional view taken on the plane of line 9—9 of FIG. 3, also illustrates, in phantom line, the relative cross-sectional positional relationship of members 18 and 20 when they are closed against each other. When members 18 and 20 are moved to an open position as depicted in FIG. 3, respective end surfaces 42 of member 20 and 42a, fragmentarily illustrated in FIG. 10, of member 18 are brought into juxtaposed relationship with each other and may, in fact, if desired, abut against each other. In the preferred embodiment, apparatus 14 is also provided with a plurality of flexible support cables 90 and 92 with such being disposed, generally, at opposite sides of members 18 and 20 and having their respective opposite ends secured to members 18 and 20.

For example, referring to FIGS. 4 and 5, member 20 may be provided with apertures 94 and 96 formed through walls 48 and 50 (with member 18 being similarly provided with apertures 94a and 96a) by which suitable anchor or fastener means 98 (FIG. 3) may secure an end of each of the cables thereto. The provision of such cables 90, 92, or some structure equivalent thereto, enhances the load-carrying capability of member 20.

Member 20 is also preferably provided with a plurality of apertures 100 formed through the lateral wall 38 while member 18 is likewise provided with apertures 100a. Such apertures 100a may, in turn, receive suitable fastener means such as bolts 102 therethrough for fixedly secured member 18 to a related mounting member 104 which, in turn, may be suitably secured as by bolt means (one of which is shown at 106) to an attachment member 108 carried by the towing vehicle 10.

Apertures 100, provide a means for draining, as by gravity, any free water which might otherwise accumulate within member 20 when in its opened position. In this respect, it should also be brought out that in the preferred embodiment of the invention, member 20 has suitable resilient means as, for example, an elongated resilient member 110 operatively carried thereby. Even though various means may be employed to effect such securing of the resilient means 110 to member 20, it is contemplated that a suitable adhesive or cement would be employed as between resilient bumper means 110 and member 20. However, as also shown, it is conceivable that resilient means 110 may be provided with integrally formed extensions 112 which could be deflectably forced through select aperture means 100 to thereby effect a mechanical locking of the resilient member 110 to member 20.

In the event such resilient bumper means 110 is employed, it is preferred that passage means 114 be provided in order to enable the gravity draining of free water from apertures 100 and through such drain passage means.

In view of the foregoing it should be apparent, especially in view of FIG. 1, that when in operation apparatus 14 is effective for containing the wheel assembly 22 of the towed vehicle in such a manner as to effectively preclude rotation of the wheel assembly 22, about the centerline of rotation of its associated steering gear, by the side walls 48 and 50 of lower member 20 engaging the tire 24 while tilting of the towed vehicle, generally with respect to a horizontal plane, is effectively precluded by side walls 48a and 50a of the vertical member 18. In other words, the establishment of desired relative position of the towed vehicle is primarily determined by members 18 and 20 which also engage the tire 24 of the towed vehicle and not by the straps 32 and 34 which are provided primarily to assure the continued existence of the relationship so established by members 18 and 20 as by preventing the towed vehicle from being pulled out during towing. Further, as is evident from FIG. 1, member 18 is effective for engaging the tire 24 of the towed vehicle at a point even above the axis of the wheel assembly 22 thereby greatly minimizing the actual reaction forces applied thereto and accordingly minimizing possible damage to the wheel 22 as might occur when forces tending to restrain tilting of the towed vehicle are applied to the wheel assembly 22 at heights, for example, lower than the axis of the wheel assembly 22.

It should also be apparent that when the apparatus 14 is not being employed for towing a vehicle, it need not be removed from the towing or carrying vehicle in that all that needs to be done is to pivotally swing member 20 to a vertical position against member 18 as depicted in phantom line in FIG. 3. In so doing, the socket-like arrangements or hinging means defined generally by 56a, 68, and 56, 68a rotate with respect to each other about the centerline of hinge pin 80 in a manner whereby surface 62a while moving in relation to surface 78 remains in juxtaposition therewith and surface 62 while moving in relation to surface 78a remains in juxtaposition therewith.

With member 20 thusly raised, it can be seen that the structure assumes a box-girder-like configuration which extends upwardly so as to provide added protection against possible damage to the rear of the towing vehicle should it be there struck by another vehicle. Further, if as in the preferred embodiment, the resilient bumper or strip 110 is provided with a layer or coating 120 of reflectorized material, such serves as additional safety means at night especially if certain of the rear lamps of the towing vehicle have failed.

The invention, because of its inherent characteristics already described, may also be employed in arrangements wherein, for example, the cycle is not towed but rather carried by the transporting vehicle.

Figure 11:
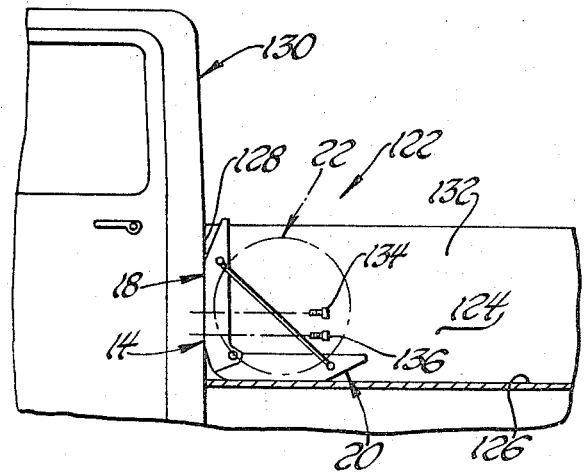
FIG. 11 is a fragmentary side elevational view of a vehicle, partly in cross-section, equipped with apparatus according to the invention, wherein the vehicle is of a truck-like type.
Figure 12:
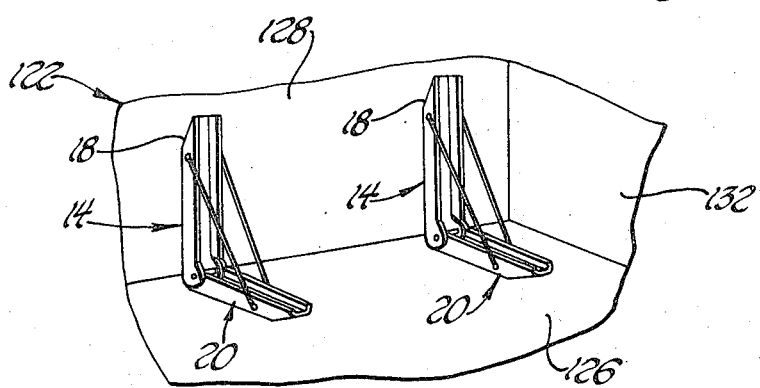
FIG. 12 is a fragmentary perspective view illustrating how, for example, the vehicle of FIG. 11 could be provided with a plurality of such apparatus of the invention.

For example, FIGS. 11 and 12 illustrate a truck 122, fragmentarily, have a cargo carrying section of areas 124 generally defined by a cargo bed or floor portion 126, a forward disposed wall 128 (which may form a part of the truck cab 130) and oppositely disposed side walls one of which is shown at 132. As can be seen, the apparatus 14 may be secured, as by, for example, screws 134 and 136, extending through apertures 100a of member 18, to the forward wall 128 of the cargo compartment in a manner permitting member 20 to rest upon the floor 126.

As shown in the fragmentary perspective view of FIG. 12, a plurality of such structures 14 may so be mounted on the wall 128 with each being capable of carrying therein the front wheel assembly 22 of the related cycle as depicted generally in phantom line in FIG. 11.

In employing the apparatus 14 in the manner shown by FIGS. 11 and 12, at least one additional important advantage is obtained. That is, once the cycles have been removed from the cargo area 124 it is not necessary to remove the apparatus 14 in order to utilize substantially all of the cargo area. All that needs to be done is to swing the lower members 20, of each of the structures 14, upwardly and against respective members 18 thereby clearing that space of the floor 126, previously occupied by such members 20, for cargo carrying capability.

Although members 18 and 20 may be formed of any suitable metal or plastic material, in the preferred embodiment of the invention, such members 18 and 20 are formed of aluminum thereby providing relatively light weight while assuring relatively high strength and greatly minimizing or eliminating undesired oxidation thereof.

Although only one preferred embodiment of the invention has been disclosed and described, it is apparent that other embodiments and modifications of the invention are possible within the scope of the appended claims.

I claim:

1. Apparatus for transporting a first vehicle having at least two wheels at least one of said wheels being a normally forwardly disposed wheel of said first vehicle, comprising first and second wheel-receiving members pivotally connected to each other and adapted to receive said one of said wheels therein, said first and second wheel-receiving members being substantially identical to each other and having hinging means identical to each other, each of said first and second wheel-receiving members having a generally U-shaped channel-like configuration when viewed in transverse cross-section so as to have respective side walls thereof substantially coplanar with each other in a manner permitting abutting engagement therebetween when said first and second wheel-receiving members are relatively pivotally rotated toward each other, one of said wheel-receiving members being effective to engage a lower disposed portion of said one of said wheels as to thereby vertically support said one of said wheels and concomitantly laterally confine said lower disposed portion of said one of said wheels between said side walls of said one of said wheel-receiving members, and the other of said wheel-receiving members being effective to engage a forwardly disposed portion of said one of said wheels and concomitantly laterally confine said forwardly disposed portion of said one of said wheels between said side walls of said other of said wheel-receiving members, said other of said wheel-receiving members being effective to engage said forwardly disposed portion of said one of said wheels at a height above the axis of rotation of said one of said wheels.

2. Apparatus according to claim 1 wherein said hinging means comprises a first hinge-like extension formed at one end and at one side of one of said wheel-receiving members as to be substantially coplanar with the side wall at said one side, and a second hinge-like extension formed at said one end and at an other side opposite to said one side of said one of said wheel-receiving members, said second hinge-like extension being formed integrally with the side wall at said other side and offset therefrom as to be generally inwardly thereof and more closely aligned with said side wall at said one side.

3. Apparatus according to claim 1 and further comprising means for detachably securing one of said wheel-receiving members to a second transporting vehicle for transporting said first vehicle.

4. Apparatus according to claim 1 and further comprising friction generating means associated with said wheel-receiving members for maintaining said one of said wheel-receiving members in a selected position when said one of said wheel-receiving members is pivotally rotated toward the other of said wheel-receiving members.

5. Apparatus according to claim 1 and further comprising additional support means operatively connected to each of said first and second wheel-receiving members at points spaced from said hinging means to thereby provide additional support to said one of said wheel-receiving members when said one of said wheels has been received therein.

6. Apparatus according to claim 5 wherein said additional support means comprises cable means adapted to be placed in tension in providing said additional support.

7. Apparatus according to claim 1 and further comprising resiliently deflectable bumper means carried by said one of said wheel-receiving members.

8. Apparatus according to claim 7 and further comprising aperture means formed through the wall interconnecting the side walls of said one of said wheel-receiving members, and passage means formed by said bumper means, said aperture means and said passage means being effective to permit the draining of free water from within said one of said wheel-receiving members.

9. Apparatus according to claim 1 wherein in each of said first and second wheel-receiving members the wall joining the opposite sides thereof is planar for a major portion of its length, and wherein each end of each of said first wheel-receiving members spaced furthermost away from said hinging means is defined by an end surface of the said wall joining the opposite sides at an elevation substantially that of the height of said side walls whereby an inclined side-wall joining wall extends from said end surface to said major planar portion.

10. Apparatus according to claim 1 wherein said hinging means comprises a first hinge plate-like portion integrally formed with said first wheel-receiving member and being situated to generally overlap a portion of said first wheel-receiving member so as to be seen at an other side of said first and second wheel-receiving members opposite to said one side of said first and second wheel-receiving members.

* * * * *